United States Patent
Park (10) Patent No.: US 9,596,954 B2
(45) Date of Patent: *Mar. 21, 2017

(54) COOKWARE THAT FUNCTIONS AS A LOW PRESSURE COOKER

(71) Applicant: Jong Peter Park, Pasadena, CA (US)

(72) Inventor: Jong Peter Park, Pasadena, CA (US)

(*) Notice: Subject to any disclaimer, the term of this patent is extended or adjusted under 35 U.S.C. 154(b) by 498 days.

This patent is subject to a terminal disclaimer.

(21) Appl. No.: 14/135,194

(22) Filed: Dec. 19, 2013

(65) Prior Publication Data

US 2014/0102315 A1 Apr. 17, 2014

Related U.S. Application Data (63) Continuation of application No. 12/939,881, filed on Nov. 4, 2010, now Pat. No. 8,689,680.

(51) Int. Cl.
| | | |
|---|---|---|
| *A47J 27/092* | (2006.01) | |
| *A47J 27/022* | (2006.01) | |
| *A47J 36/36* | (2006.01) | |

(52) U.S. Cl.
CPC .......... *A47J 27/092* (2013.01); *A47J 27/022* (2013.01); *A47J 36/36* (2013.01)

(58) Field of Classification Search
CPC ......... A47J 27/022; A47J 27/092; A47J 36/36
USPC .... 99/325, 403, 422, 377, 646 C; 126/375.1, 126/390.1, 373.1; 220/573.1, 573.4, 912; 219/440
See application file for complete search history.

(56) References Cited

U.S. PATENT DOCUMENTS

| | | |
|---|---|---|
| 1,681,150 A | 8/1928 | Vischer, Jr. |
| 2,441,131 A | 5/1948 | Blackman et al. |
| 2,622,591 A | 12/1952 | Bramberry, Jr. |
| 2,876,634 A | 3/1959 | Zimmerman et al. |
| 2,933,586 A | 4/1960 | Schusterius |
| 3,463,140 A | 8/1969 | Rollor, Jr. |
| 3,489,075 A | 1/1970 | O'Reilly |
| 3,547,298 A | 12/1970 | Versluis |
| 3,721,363 A | 3/1973 | Bressler et al. |
| 4,024,982 A * | 5/1977 | Schultz ............... A47J 27/0806 220/293 |

(Continued)

FOREIGN PATENT DOCUMENTS

| | | |
|---|---|---|
| CN | 201002790 Y | 1/2008 |
| CN | 201665359 U | 12/2010 |

(Continued)

*Primary Examiner* — David Angwin
*Assistant Examiner* — John J Norton (57) ABSTRACT

An eco green cookware is provided, having a double-layered wall structure and comprising a heat transfer medium within a cavity of the double-layered wall structure. The eco green cookware comprises: a container comprising an inner shell and an outer shell, wherein upper parts of the inner shell and outer shell are rolled a number of times together to form a rolled joint, an upper part of the inner shell is provided with a concave member, a heat transfer medium is provided within the cavity, a first heat transfer member is inserted and installed at the bottom portion of the cavity, and a second heat transfer member is affixed to the bottom surface of the first heat transfer member; an inner cover comprising an inner peripheral portion in the form of an inverted "L" whose inside bend forms a round portion; an outer cover; and pressure release devices.

18 Claims, 5 Drawing Sheets

(56) References Cited

U.S. PATENT DOCUMENTS

| | | |
|---|---|---|
| 4,106,486 A | 8/1978 | Lee |
| 4,402,195 A | 9/1983 | Campbell |
| 4,629,866 A | 12/1986 | Proctor |
| 4,648,382 A | 3/1987 | Greenbacker |
| 4,952,765 A | 8/1990 | Toyosawa |
| 5,088,179 A | 2/1992 | Gibbon |
| 5,135,132 A | 8/1992 | Potochnik |
| 5,169,016 A | 12/1992 | Hinz, Jr. |
| 5,277,326 A | 1/1994 | Chiba |
| 5,508,498 A | 4/1996 | Rheinish et al. |
| 5,515,995 A | 5/1996 | Allen et al. |
| 5,918,761 A | 7/1999 | Wissinger |
| 5,968,618 A | 10/1999 | Miller |
| 6,191,393 B1 | 2/2001 | Park |
| 6,320,166 B1 | 11/2001 | Park |
| 6,386,431 B1 | 5/2002 | Lin |
| 6,467,645 B2 | 10/2002 | Park |
| 6,631,824 B2 | 10/2003 | Park |
| 6,672,595 B2 | 1/2004 | Park |
| D487,212 S | 3/2004 | Park |
| 6,698,337 B1 | 3/2004 | Park |
| 6,755,319 B2 | 6/2004 | Park |
| 6,802,438 B2 | 10/2004 | Thompson |
| 7,086,326 B2 | 8/2006 | Yokoyama |
| 8,387,820 B2 | 3/2013 | Park |
| 8,393,262 B1 | 3/2013 | Molayem |
| 2003/0041741 A1 | 3/2003 | Park |
| 2003/0209154 A1 | 11/2003 | Park |
| 2003/0209551 A1 | 11/2003 | Park |
| 2004/0118838 A1 | 6/2004 | Park |
| 2004/0232144 A1 | 11/2004 | Edmark |
| 2005/0098565 A1 | 5/2005 | Liu |
| 2005/0205577 A1 | 9/2005 | Park |
| 2005/0263015 A1 | 12/2005 | Mulgrew |
| 2006/0219712 A1 | 10/2006 | Ramirez |
| 2006/0289538 A1 | 12/2006 | Hasegawa |
| 2007/0000915 A1 | 1/2007 | Cheng |
| 2009/0108029 A1 | 4/2009 | Fromm |
| 2010/0199860 A1 | 8/2010 | Seitz et al. |
| 2012/0024845 A1 | 2/2012 | Lee et al. |
| 2014/0102315 A1 | 4/2014 | Park |
| 2014/0326733 A1 | 11/2014 | Park |

FOREIGN PATENT DOCUMENTS

| | | |
|---|---|---|
| CN | 202229241 U | 5/2012 |
| DE | 19544717 A1 | 6/1997 |
| JP | 2000023828 A | 1/2000 |
| JP | 2004241177 A | 8/2004 |
| KR | 2003465230000 | 4/2004 |

\* cited by examiner

COOKWARE THAT FUNCTIONS AS A LOW PRESSURE COOKER

CROSS-REFERENCE TO RELATED APPLICATIONS

This application is a continuation of U.S. patent application Ser. No. 12/939,881, filed Nov. 4, 2010, the contents of which are incorporated herein by reference in its entirety.

FIELD OF THE INVENTION

The present invention relates to cookware, and more particularly, to eco green cookware having a double-layered wall structure and comprising a heat transfer medium within a cavity of the double-layered wall structure, wherein the cookware has a heat insulating property and functions as a low pressure cooker, thereby saving energy and preventing the food's nutrients from escaping.

BACKGROUND OF THE INVENTION

Various types of cooking vessels are known and used in a kitchen to cook food. Typical cooking apparatus such as a pan and a rice cooker are made of a single-layered stainless steel. The single-layered stainless steel is good for transferring heat fast, but has a disadvantage that food gets stuck to the cooking apparatus.

To solve the above problem, cooking vessels having a double-layered structure has been proposed.

Japanese Utility Model Laid-Open No. Sho56-169825 teaches a heating pot comprising an inner wall and an outer wall, wherein a closed space is provided therebetween, and a working fluid is injected, the working fluid vaporizing and moving by heating within the space, and condensing by cooling. Japanese Utility Model Laid-Open No. Sho63-48526 teaches a heat-insulated cooking apparatus, wherein a vacuum heat-insulated layer is formed in a container and in a side wall portion, and heat is transferred from a bottom portion, the container comprising the side wall portion and bottom portion.

However, such cooking vessels have the risk of explosion due to the pressure of substances between an inner wall and an outer wall.

Moreover, the typical cooking vessels have a problem that when cooking soup, soup within the vessels is leaked out so that vitamin is destroyed or escaping.

SUMMARY OF THE INVENTION

The present invention contrives to solve the disadvantages of the prior art.

Problems to be Solved

The present invention is designed to solve the above problems, and aims to provide cookware having a double-layered structure, thereby making cooking smoothly, having no risk of explosion while having a heat insulating property, and allowing to avoid vapor steam of the food from leaking out to prevent the food's nutrients from escaping.

Technical Means for Solving the Problems

In order to achieve the above object, the present invention provides eco green cookware comprising:

a container comprising an inner shell and an outer shell, wherein a cavity is provided between the inner shell and the outer shell, upper parts of the inner shell and outer shell are rolled a number of times together to form a rolled joint, which is subjected to electrical welding, an upper part of the inner shell is provided with a concave member, a heat transfer medium is provided within the cavity, a first heat transfer member is inserted and installed at the bottom portion of the cavity, and a second heat transfer member is affixed to the bottom surface of the first heat transfer member;

an inner cover comprising an inner peripheral portion in the form of an inverted "L" whose inside bend forms a round portion, wherein the inner peripheral portion is made of steel material coated with silicon rubber, and covers the upper surface of the concave portion of the inner shell to form moisture sealing;

an outer cover positioned above the inner cover; and pressure release devices for releasing the pressure within the cavity.

Also, the present invention provides eco green cookware characterized in that the heat transfer medium is silicon oil.

In addition, the present invention provides eco green cookware characterized in that the first heat transfer member and the second transfer member are made of aluminum or copper.

Moreover, the present invention provides eco green cookware characterized in that the pressure release device comprises a valve member with an elastic property, the valve member comprising a valve body in the form of a hollow cylinder, a valve neck, and a valve head, the valve neck extending to the valve body and having a smaller diameter than the valve body, and the valve head tapered forwardly, wherein the valve neck is inserted into a hole of the outer shell of the container.

Furthermore, the present invention provides eco green cookware characterized in that the pressure release device comprises a spring housing, a spring, and a spring suspension member, the spring housing comprising a spring housing body, a spring housing head, and a fixing nut, the spring housing being hollow, wherein a hollow portion of the spring housing body has a greater diameter than a hollow portion of the spring housing head, and wherein the spring is provided within the hollow portion of the spring housing body, the spring comprising a spring body for performing elastic action and an pressure control valve for sealing the hollow portion of the spring housing head at normal times, and the spring suspension member being coupled to a screw of the body of the spring housing and supporting the spring, and having a pressure controlling hole at one end.

Effects of the Invention

The cookware according to the present invention has a heat insulating property, thereby improving flavor of the food and saving energy greatly, and thus the cookware is environment-friendly.

Also, according to the present invention, there is no risk of explosion, because it adopts a double-layered structure and a pressure release device.

In addition, the present invention allows avoiding vapor steam of the food from leaking out so as to prevent the food's nutrients such as flavor or vitamin from escaping outside.

The cooking vessel of the present invention allows cooking the food automatically and slowly even after the heat source is removed and thus the cooking vessel functions as a slow cooker. The space between the outer cover and the inner cover traps heat therein and holds the temperature for an extended period of time, and prevents the heat from dissipating upwardly.

The cooking vessel of the present invention functions as a pressure cooker and a slow cooker and the advantage was achieved by the structure of the outer cover, the inner cover, steam holes, concave portion, and silicon rubber of the inner peripheral portion.

During cooking, the silicon rubber of the inner peripheral portion expands as the temperature increases, and the inner cover does not open despite high pressure inside the container during cooking. Besides, steam gets out of the steam holes and condenses into water, flowing to the concave portion. The dome shape of the inner and outer covers helps the water flowing into the concave portion. Then, the water in the concave portion and the silicon rubber of the inner peripheral portion make possible the moisture sealing by preventing vapor steam from leaking out during cooking. Accordingly, the cooking vessel of the present invention preserves vitamins, nutrients and natural flavors of food.

Moreover, the present invention allows cooking the food automatically and slowly even after the heat source is removed and thus the cookware functions as a slow cooker.

Further, the present invention uses two lids, so that the cookware functions as a semi-pressure cooker.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

All the contents of U.S. Pat. No. 6,191,393 issued on Dec. 2, 2001, U.S. Pat. No. 6,467,645 issued Oct. 22, 2002, U.S. Pat. No. 6,631,824 issued on Oct. 14, 2003, U.S. Pat. No. 6,698,337 issued on Mar. 2, 2004, U.S. Design Pat. No. 486,352 issued on Feb. 10, 2004, U.S. Design Pat. No. 487,212 issued on Mar. 2, 2004, Korean Patent Publication No. 10-2005-0115981, US Patent Publication No. 2004/0094544, US Patent Publication No. 2004/0118838, and US Patent Publication No. 2012/0085243, all by the inventor of the present application are incorporated herein by reference.

Hereinafter, the present invention will be described in detail with reference to the drawings.

Figure 1:
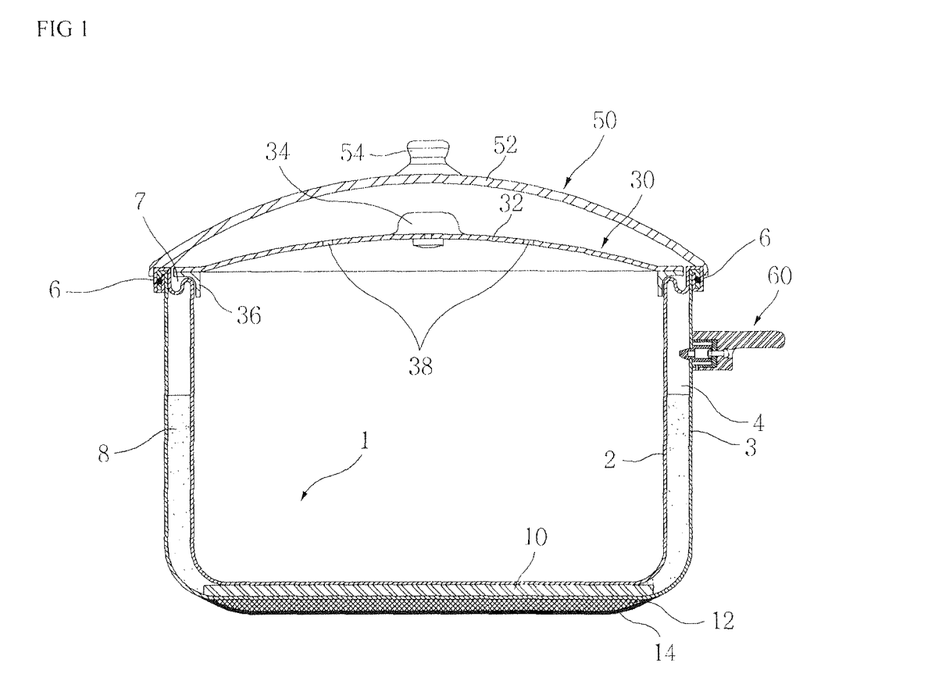
FIG. 1 shows a cross-sectional view of one embodiment of cookware according to the present invention.

FIG. 1 shows a cross-sectional view of one embodiment of cookware according to the present invention.

The cookware comprises a container (1), an inner cover (30), and an outer cover (50). The container (1) comprises an inner shell (2), and an outer shell (3), wherein a cavity (4) is provided between the inner shell (2) and the outer shell (3), and the inner shell (2) and the outer shell (3) form a joint (6) at an upper part of the container (1).

The joint (6) is made such that the inner shell (2) and the outer shell (3) are jointly rolled several times, and the joint is fixedly jointed by electrical welding.

In addition, a concave portion (7) is formed at an upper part of the inner shell (2), wherein the concave portion (7) forms moisture sealing to prevent vapor steam from leaking out.

Such moisture sealing prevents vitamin from escaping when the food's nutrients are leaked out.

A heat transfer medium (8) is provided within the cavity (4).

The heat transfer medium (8) is, preferably, silicon oil. Since silicon oil has an advantage for maintaining a melting point of −25° C. and a boiling point of 200° C., a heat preserving rate of 70% or more can be maintained even when the food has been preserved for a long time.

The heat transfer medium, preferably, occupies 55-90% of the cavity (4).

The heat transfer medium (8) is provided within the cavity (4) of the inner shell (2) and outer shell (3), so that the cookware according to the present invention is good for transferring heat during cooking and keeps the food warm for about four or more hours, and allows the food to be cooked automatically and slowly even when the heat source is removed.

A first heat transfer member (10) is inserted at a bottom portion of the cavity (4), and a second heat transfer member (12) is separately coupled to the outer surface of the first heat transfer member (10), and a protection cover (14) is provided covering the first and second heat transfer members.

The first heat transfer member (10) is, preferably, made of aluminum or copper and, preferably, has a thickness of 1.5-2.5 mm. Similarly, the second heat transfer member (12) is, preferably, made of aluminum or copper and, preferably, has a thickness of 2-4 mm.

An inner cover (30) comprises a dome-shaped inner container (32), and an inner handle that is attached to the center portion of the inner container (32), and an inner peripheral portion (36) is securely attached to the concave part (7) of the upper portion of the container (1).

The inner handle (34) may be made of a silicon rubber ring.

The inner body (32) is, preferably, made of tempered glass.

The inner peripheral portion (36) has an inverted L-shaped cross section whose inside bend is curved so as to be fitted with the concave portion (7) of the container (1), and it is, preferably, made of steel surrounded by silicon rubber.

Generally, food's flavor and vitamins of the food are lost when vapor steam is leaked out during cooking. However, according to the structure above, since the surface of the inner peripheral portion (36) is made of silicon rubber, the inner peripheral portion (36) and the concave portion (7) form a moisture sealing and the moisture sealing prevents vapor steam from leaking out during cooking.

In addition, the structure of the silicon rubber of the inner peripheral portion (36) of the inner cover (30) allows a secure sealing so that it can fully function as a pressure cooker. The elastic lining material expands during cooking so that increased adhesion and friction between the elastic lining material and the inner shell (2) prevents the inner cover (30) from opening when the container is pressurized during cooking.

On the inner cover (30), steam holes (38) may be formed on opposite positions when viewed from above. The steam holes prevent liquid food like soup from overflowing during cooking.

An outer cover (50) comprises a dome-shaped outer container (52), and an outer handle that is attached to the center portion of the outer container (52).

A cavity is provided between the inner cover (30) and the outer cover (50) so as to prevent releasing heat during cooking.

There are two covers: inner cover (30) and outer cover (50), so the cookware also functions as a semi-pressure cooker.

The cooking vessel of the present invention functions as a pressure cooker and a slow cooker and the advantage was achieved by the structure of the outer cover (50), the inner cover (30), steam holes (38), concave portion (7), and silicon rubber of the inner peripheral portion (36).

During cooking, the silicon rubber of the inner peripheral portion (36) expands as the temperature increases, and the inner cover (30) does not open despite high pressure inside the container during cooking. Besides, steam gets out of the steam holes (38) and condenses into water, flowing to the concave portion (7). The dome shape of the inner and outer covers (30, 50) helps the water flowing into the concave portion (7). Then, the water in the concave portion (7) and the silicon rubber of the inner peripheral portion (36) make possible the moisture sealing by preventing vapor steam from leaking out during cooking. Accordingly, the cooking vessel of the present invention preserves vitamins, nutrients and natural flavors of food.

A pressure release device (60) is installed within a handle (61) attached to the outside of the container (1), and if a predetermined pressure is reached within the cavity (4), the pressure release device (60) operates to release the pressure.

Figure 2:
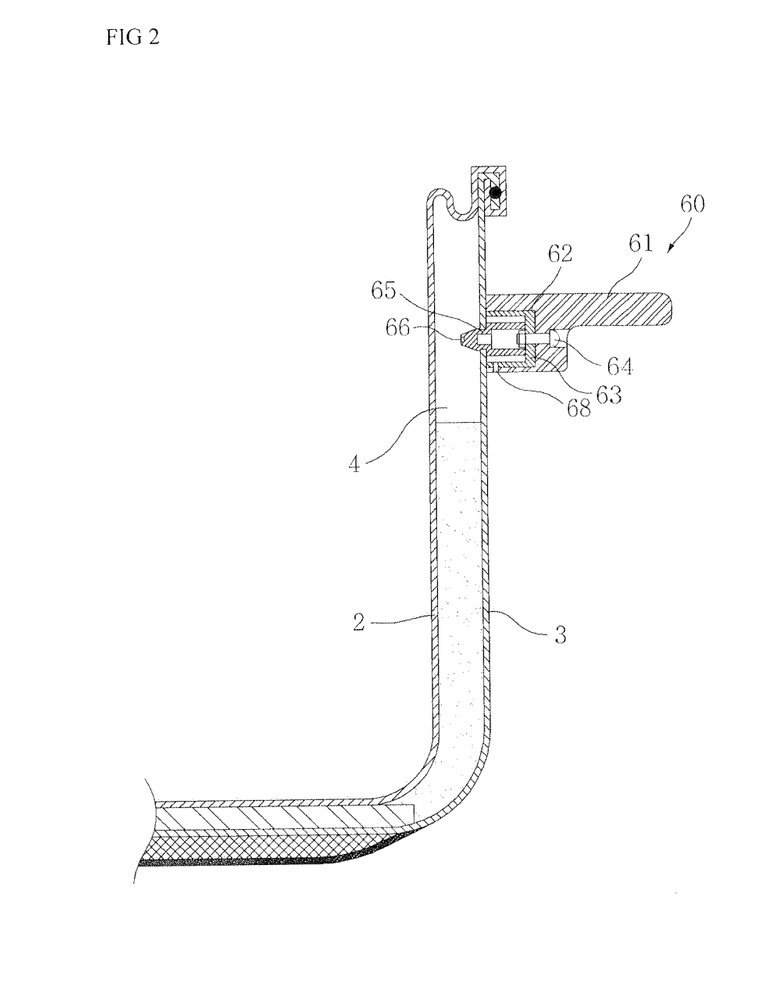
FIG. 2 shows a detailed view of a pressure release device according to the present invention.

FIG. 2 shows a detailed view of the pressure release device (60).

A bracket (63) is installed within a handle cavity (62) provided between the container's handle (61) and the outer shell (3), and this bracket (63) is affixed by a fixing part (64).

The fixing part (64) is preferably a screw.

Figure 3:
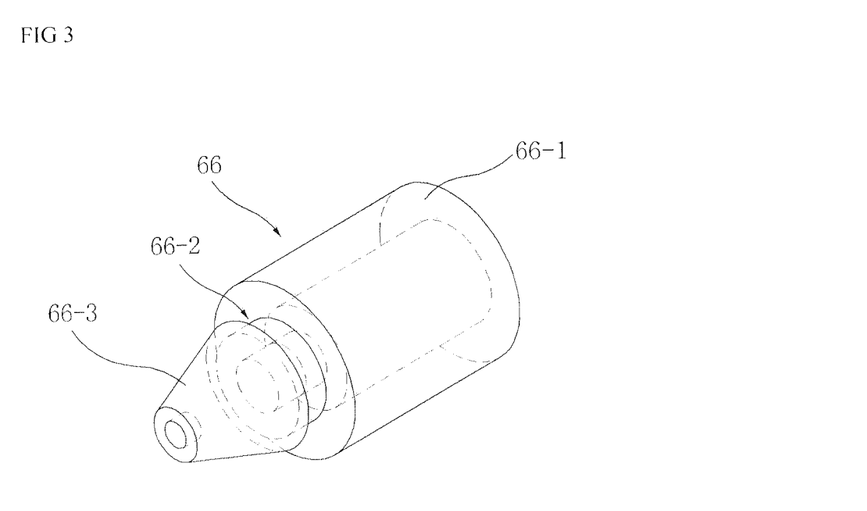
FIG. 3 shows a perspective view of a valve member of the pressure release device according to the present invention.

A valve member (66) is installed by inserting it into a hole formed on the outer shell (3) within the bracket (63). An exhaust hole (68) is formed at a bottom portion of the handle (61) to release air through downwardly. FIG. 3 shows a detailed view of a valve member (66) of the pressure release device (60).

The valve member (66) comprises a valve body (66-1), a valve neck (66-2), and a valve head (66-3), the valve body (66-1) being hollow and cylindrical, the valve head (66-3) being tapered forwardly, and the valve neck (66-2) being hollow and cylindrical with the smallest outer diameter and with its length being the same as the thickness of the outer shell (3).

As shown in FIG. 2, the valve neck (66-2) is inserted into the outer shell (3) at normal times, the valve head (66-3) is inserted into the cavity (4) of the double-layered wall, and an end of the valve body (66-1) is in contact with the bracket (63).

Figure 4:
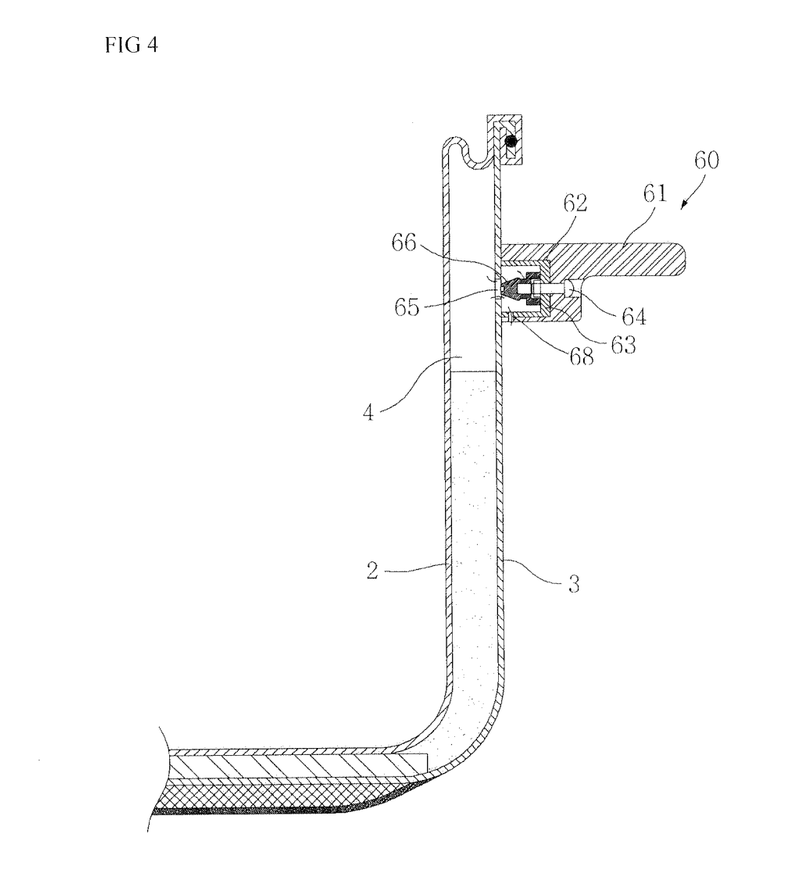
FIG. 4 shows an operational view of the pressure release device according to the present invention.

FIG. 4 shows an operational view of the pressure release device (60) according to the present invention.

If pressure within the cavity (4) increases and exceeds a predetermined level during cooking, a valve head (66-3) of the valve member (66) is pushed outside of the outer shell (3), thereby opening a hole (65) of the outer shell, and releasing pressure air through the hole (65) and releasing the air downwardly through the exhaust hole (68). When the pressure decreases, the valve member (66) returns to normal by its elastic property.

Figure 5:
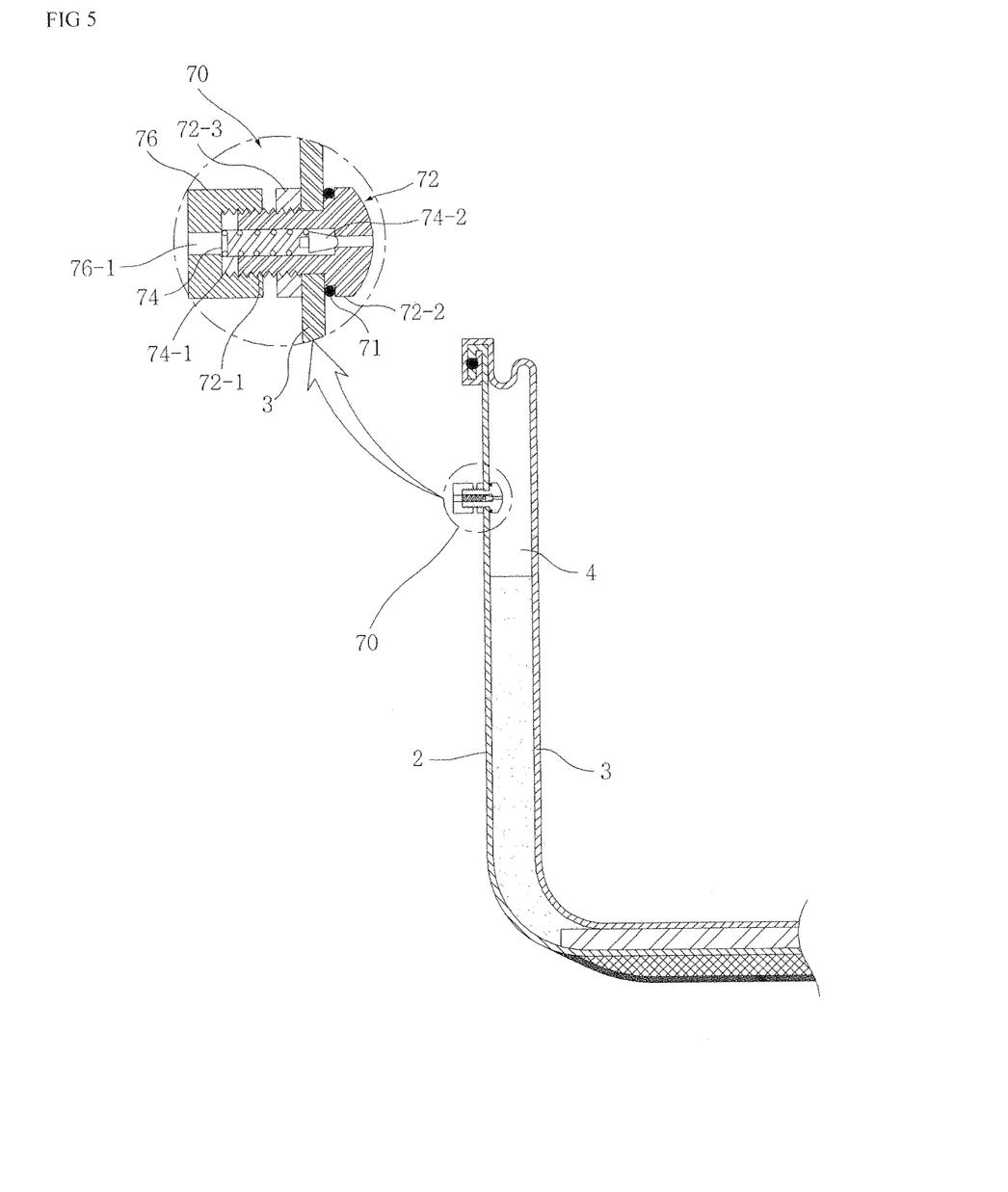
FIG. 5 shows a cross-sectional view of another embodiment of the pressure release device according to the present application.

FIG. 5 shows another embodiment of the pressure release device (70).

As another embodiment, a pressure release device (70) may be installed at a predetermined portion of the outer shell (3), separately from a handle.

The pressure release device (70) comprises a spring housing (72), a spring (74), a fixing nut (72-3), and a spring suspension member (76).

Referring to the enlarged view, the spring housing (72) comprises a spring housing body (72-1) and a spring housing head (72-2), wherein the spring housing (72) is hollow, the diameter of a hollow portion of the spring housing body (72-1) is greater than the diameter of a hollow portion of the spring housing head (72-2), the spring housing body (72-1) has a screw thread on a circumference thereof and is affixed to the fixing nut (72-3), and the spring housing (72) is affixed to a hole of the outer shell (3) and an O-ring (71) is inserted between the spring housing head (72-2) and the outer shell (3) to secure the sealing.

A spring (74) is provided within the hollow portion of the spring housing body (72-1) of the spring housing (72), and the spring (74) comprises a spring body (74-1) for performing elastic action and a pressure control valve (74-2) for sealing the hollow portion of the spring housing head (72-2) at normal times. The pressure control valve (74-2) comprises a needle valve.

The spring suspension member (76) is coupled to a screw of the spring housing body (72-1) of the spring housing (72) and supports the spring (74), wherein a pressure controlling hole (76-1) is formed at one end to be a path through which air is released.

If the pressure within the cavity (4) of the container (1) increases, the spring (74) is pushed to the left of the drawing, so the pressure control valve part (74-2) of the spring (74) forms a path to release air so as to release the pressure within the cavity (4).

If the pressure decreases, it returns to its original position by the action of the spring (74) and closes the hollow portion of the spring housing head (72-2).

The embodiments of the present invention described above are only for examples, but the present invention is not limited to these embodiments. Various other changes and modifications can be made without departing from the spirit and scope of the invention. The present invention is not limited by the description described above, but only limited by the scope of the claims attached herewith.

What is claimed is:

1. A cooking vessel having a double-layered wall structure, comprising:
    a container comprising an inner shell (2) and an outer shell (3), wherein a cavity (4) is provided between the inner shell (2) and the outer shell (3), wherein an upper part of the inner shell (2) is provided with a concave member (7), wherein a heat transfer medium (8) is provided within the cavity (4);
    an inner cover (30) for covering the upper surface of the concave member of the inner shell;
    an inner peripheral portion (36) provided along an edge of the inner cover (30) in the form of an inverted "L", wherein the inner peripheral portion is made of steel material with an elastic lining material to form a moisture seal during cooking;
    an outer cover (50) positioned above the inner cover (30); and a set of steam holes (38) formed on the inner cover (30), wherein during cooking, steam gets out of the set of steam holes, condenses into water, and flows to the concave member to form the moisture seal that prevents vapor steam from leaking out,
wherein the elastic lining material expands during cooking to prevent the inner cover from opening when the container is pressurized during cooking.

2. The cooking vessel according to claim 1, wherein upper parts of the inner shell and outer shell are rolled a predetermined number of times together to form a rolled joint (6).

3. The cooking vessel according to claim 2, wherein the rolled joint (6) is further formed by performing seamless electrical welding on edges of the inner shell (2) and the outer shell (3).

4. The cooking vessel according to claim 1, wherein a first heat transfer member (10) is inserted and installed at the bottom portion of the cavity (4), and wherein a second heat transfer member (12) is affixed to the bottom surface of the outer shell (3).

5. The cooking vessel according to claim 4, wherein each of the first heat transfer member (10) and the second heat transfer member (12) are made of aluminum or copper.

6. The cooking vessel of claim 4 further comprising a protection cover (14) configured to fit in surrounding relation to the second heat transfer member (12) in order to affix the second heat transfer member (12) to the bottom surface of the outer shell (3).

7. The cooking vessel according to claim 1, wherein the heat transfer medium (8) comprises silicone oil.

8. The cooking vessel according to claim 1, wherein the elastic lining material comprises silicone rubber.

9. The cooking vessel according to claim 1 further comprising a pressure release valve (60, 70) for releasing pressure within the cavity (4) when the pressure within the cavity (4) becomes greater than a predetermined reference pressure.

10. The cooking vessel according to claim 9, wherein the pressure release valve (60) comprises an elastic valve member (66), which comprises a valve body (66-1) in the form of a hollow cylinder, a valve neck (66-2), and a valve head (66-3), wherein the valve neck (66-2) is located in between the valve body (66-1) and the valve head (66-3), having a smaller diameter than the valve body (66-1), and wherein the valve head (66-3) tapers outwardly from the valve neck (66-2), wherein the valve neck (66-2) is inserted into a hole (65) of the outer shell (3) of the container (1).

11. The cooking vessel according to claim 10, wherein the pressure release valve (60) further comprises a bracket (63) fixedly attached to the outer shell (3), and an exhaust hole formed on the bracket (63) for releasing the pressure within the cavity (4).

12. The cooking vessel according to claim 9, wherein the pressure release valve (70) comprises:
- a spring housing (72), comprising a spring housing body (72-1) and a spring housing head (72-2);
- a fixing nut (72-3) wherein the spring housing (72) is fixedly attached to the outer shell (2) by the fixing nut's engagement with the spring housing (72), wherein the spring housing head (72-2) is placed in an inner space of the outer shell (2);
- a spring (74) provided within a hollow portion of the spring housing body (72-1);
- an elastic pressure control valve (74-2) provided on an end of the spring (74) for blocking a hollow portion of the spring housing head part (72-2); and
- a spring suspension member (76), wherein the spring is biased against the spring suspension member (76), wherein the hollow portion of the spring housing body (72-1) has a greater diameter than the hollow portion of the spring housing head part (72-2), wherein an internal thread of the spring suspension member (76) is engaged with an external thread of the spring housing body (72-1), wherein the spring suspension member (76) comprises a pressure controlling hole (76-1).

13. The cooking vessel according to claim 12, wherein the pressure control valve (74-2) is made of heat resistant rubber and the fixing nut (72-3) is made of heat resistant material; wherein the spring (74) biases the pressure control valve (74-2) against the pressure controlling hole (76-1); wherein excessive pressure generated in the cavity (4) pushes the pressure control valve (74-2) and is released through the hollow portion of the spring housing body (72-1) and the pressure controlling hole (76-1).

14. The cooking vessel according to claim 12, wherein the pressure control valve (74-2) comprises a needle valve.

15. The cooking vessel according to claim 12, wherein the pressure release valve (70) further comprises an O-ring (71) which is inserted between the spring housing head (72-2) and the outer shell (3) for secure sealing.

16. The cooking vessel of claim 9 further comprising a handle affixed to the outer shell, wherein the pressure release valve is disposed within the handle.

17. The cooking vessel of claim 1, wherein the heat transfer medium comprises air.

18. The cooking vessel of claim 1, wherein the inner cover (30) comprises glass.

* * * * *